H. A. POPPENHUSEN.
FURNACE.
APPLICATION FILED DEC. 6, 1916.
1,243,871.
Patented Oct. 23, 1917.
5 SHEETS—SHEET 1.
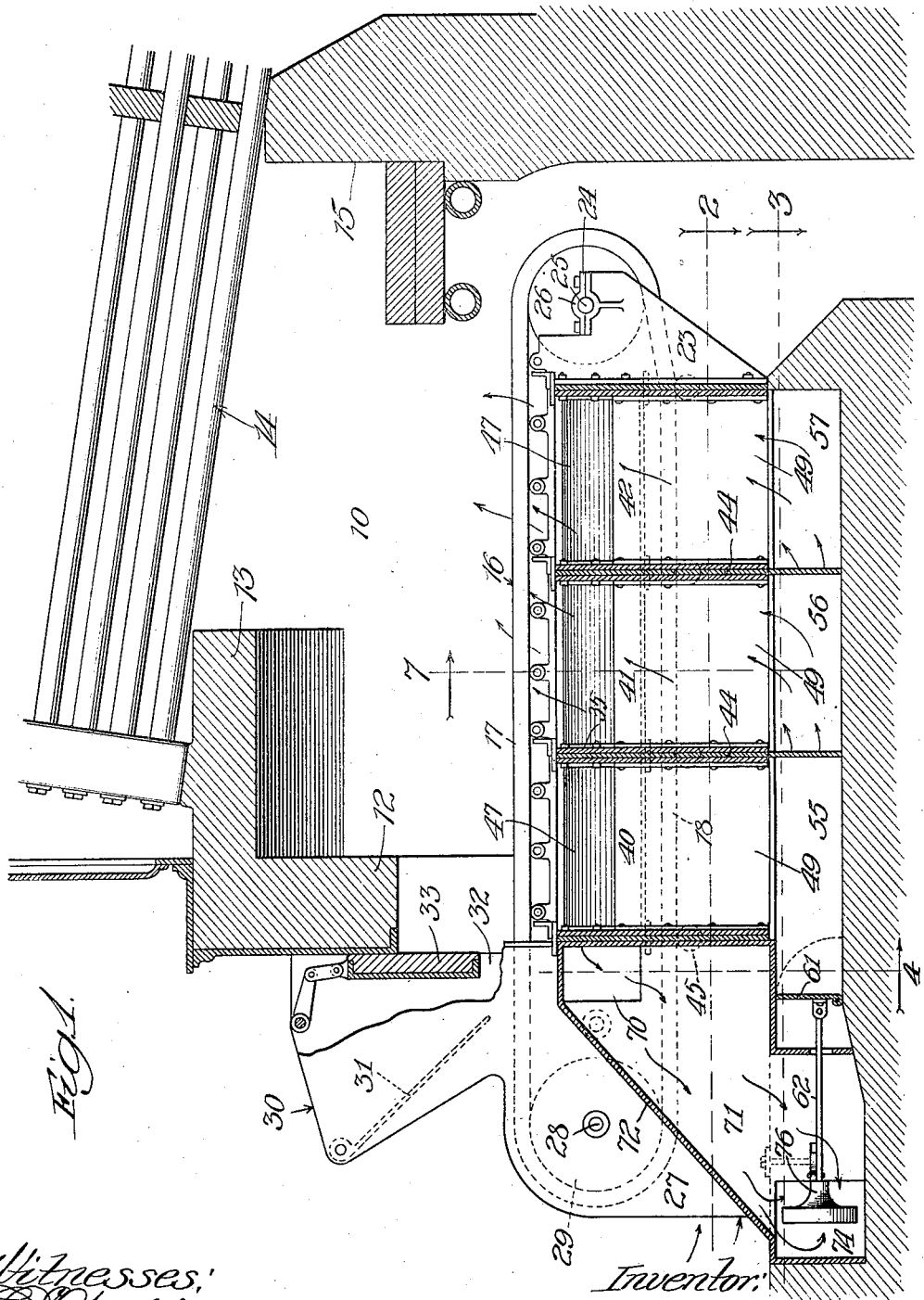
Witnesses:
Inventor:
Herman A. Poppenhusen,
By Poole & Wann
Attys.

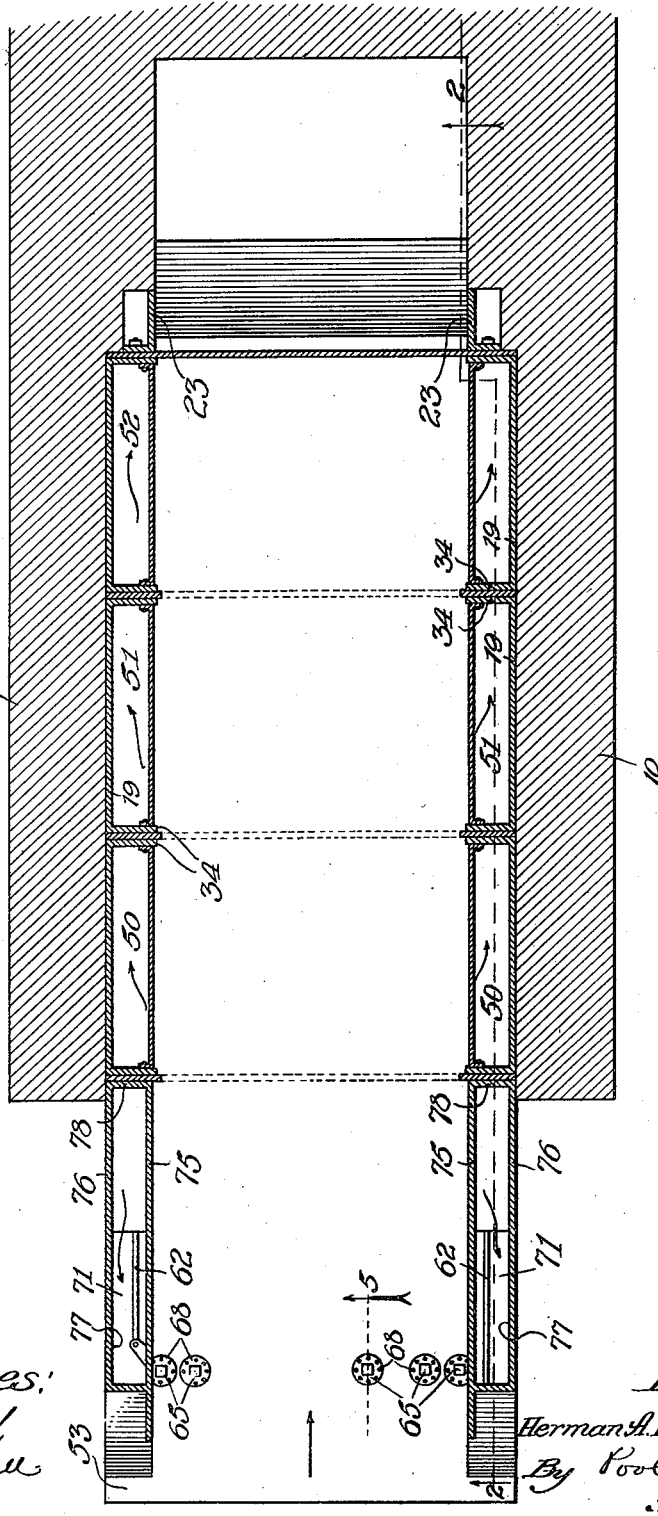

H. A. POPPENHUSEN.
FURNACE.
APPLICATION FILED DEC. 6, 1916.
1,243,871. Patented Oct. 23, 1917.
5 SHEETS—SHEET 3.
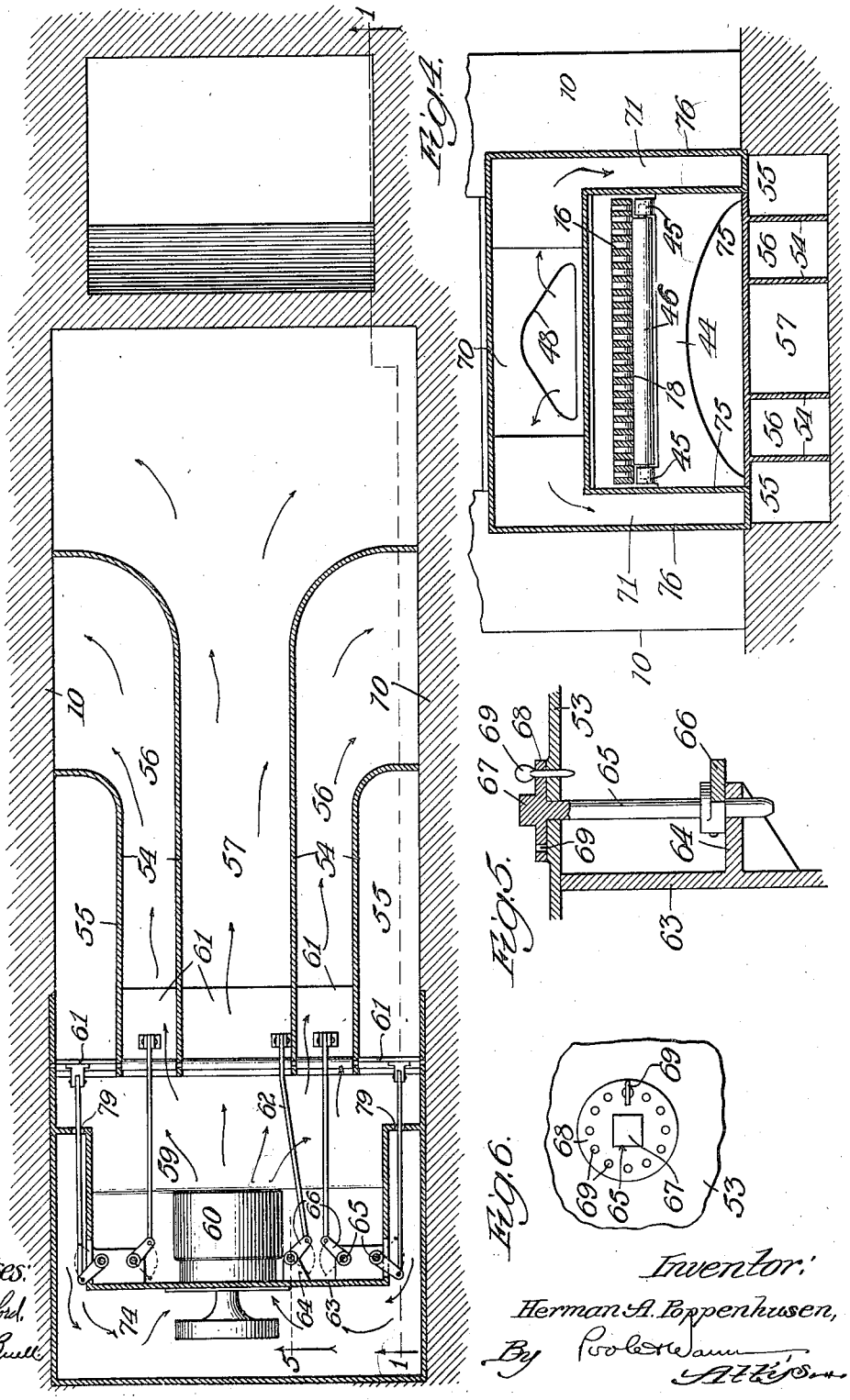

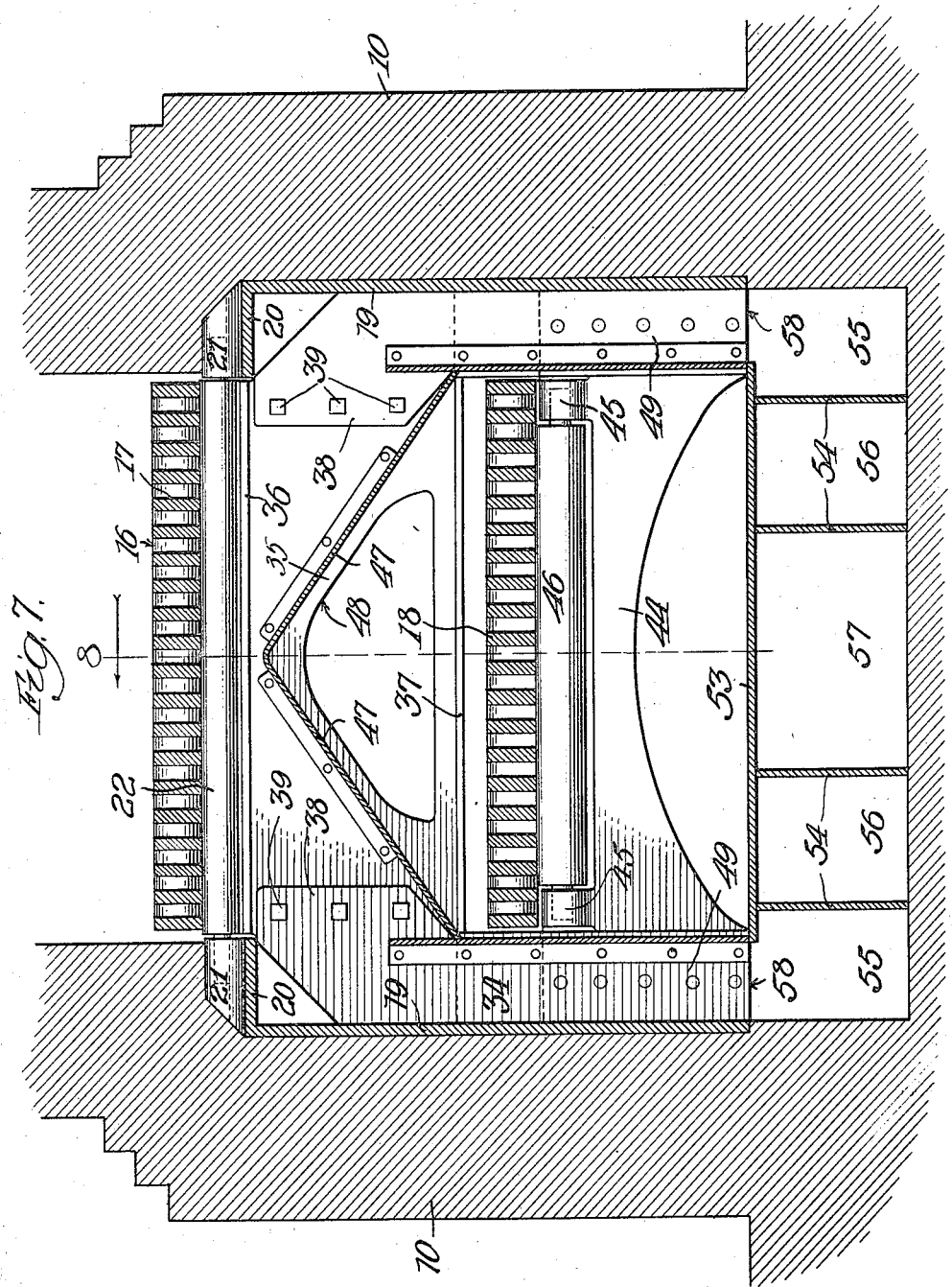

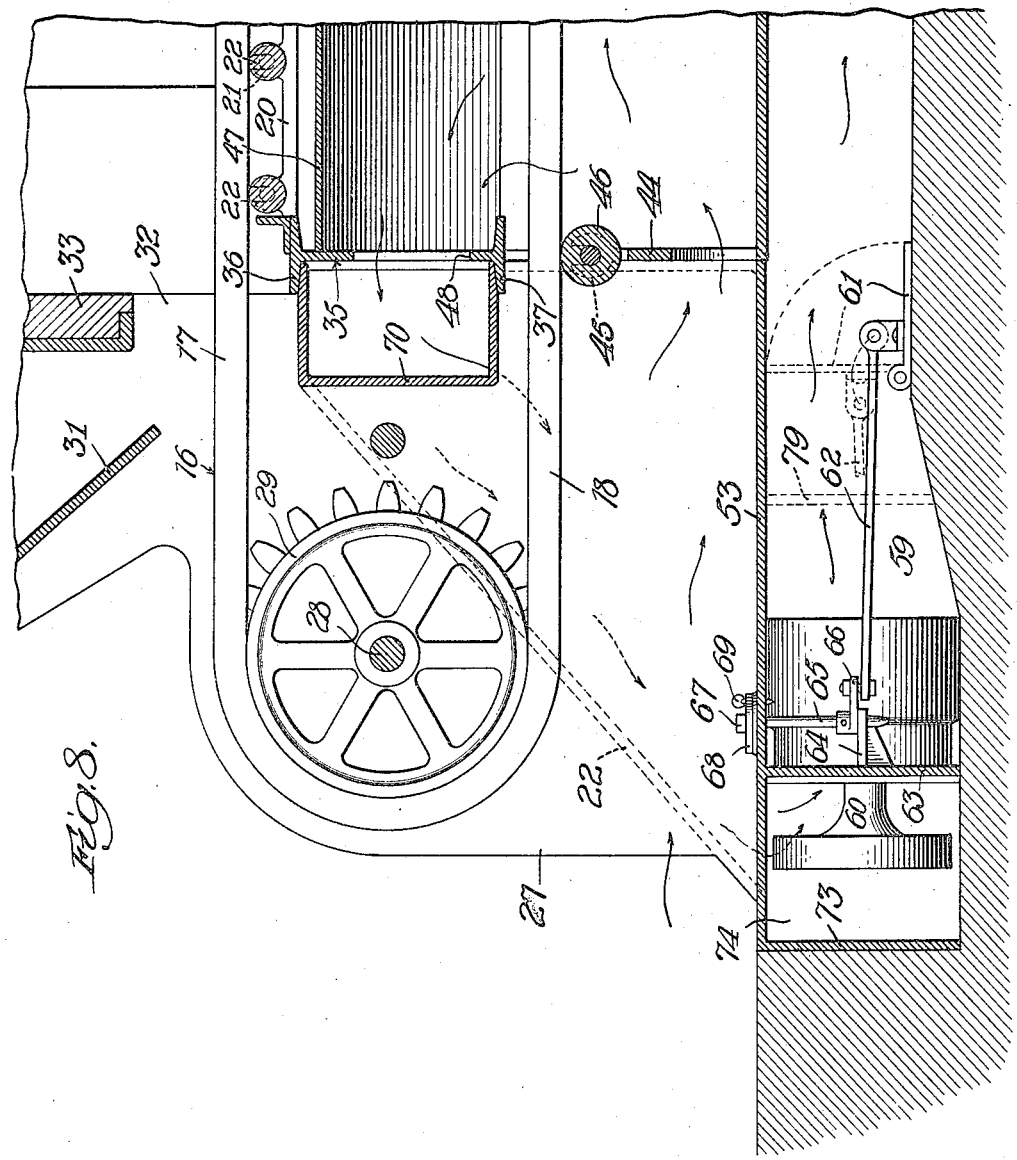

UNITED STATES PATENT OFFICE.

HERMAN A. POPPENHUSEN, OF HAMMOND, INDIANA, ASSIGNOR TO GREEN ENGINEERING COMPANY, OF EAST CHICAGO, INDIANA, A CORPORATION OF ILLINOIS.

FURNACE.

1,243,871.      Specification of Letters Patent.      Patented Oct. 23, 1917.

Application filed December 6, 1916.    Serial No. 135,468.

*To all whom it may concern:*

Be it known that I, HERMAN A. POPPENHUSEN, a citizen of the United States, residing at Hammond, in the county of Lake and State of Indiana, have invented new and useful Improvements in Furnaces, of which the following is a specification.

This invention relates to furnaces, and more particularly to furnaces of steam boilers of the commercial type, and embracing the mechanical features of stoking and air supply, namely, by the use of a traveling or movable grate, preferably of the endless chain type, and an arrangement of forced draft ducts or passages.

In furnaces of the character described, a desirable construction or arrangement of the air supply or draft involves the use of a series of compartment directly below the active grate area, each compartment being supplied with air through forced draft ducts or passages communicating with the compartments. The purpose of the arrangement is to divide the active grate area into a number of smaller areas, separated from each other and each supplied with air from separate air passages, thereby affording a more accurate regulation of the draft and control of the combustion of the fuel, to the end that the furnace can be operated with greater economy and efficiency.

In furnaces equipped with chain grate stokers these compartments are ordinarily located between the upper and lower leads or portions, and the air supplied thereto from the sides of the grate, and as a result the air does not pass through the lower lead of the grate prior to passing through the upper or active grate area. On the other hand, in a furnace operating under natural draft, the air enters the air space below the grate in the usual manner, passing upwardly through the lower lead of the grate and thence through the upper lead or active grate surface. The advantages of this arrangement, which is possible where natural draft is employed, but not so where forced draft is used in connection with the so-called compartment arrangement below the active grate surface, are twofold—first, the passage of the cool air upwardly through the lower portion or lead of the grate tends to cool the same, thereby materially reducing the deterioration of the grate, and, secondly, the heat absorbed from the heated lower portion of the grate raises the temperature of the air, thus securing the advantage of prematurely heating the air before coming into contact with the fuel bed.

The object of this invention is, therefore, to provide a construction whereby the desirable features pointed out in connection with the natural draft may be also secured where forced draft is used exclusively, this being accomplished by combining features of construction of both systems of draft, which broadly consists in drawing the air through the lower lead of the grate by mechanical means and by the same means forcing the air into the passages which supply the air to the upper lead or active grate surface.

The construction whereby this result is secured will now be fully described and in connection with the accompanying drawings, wherein—

Figure 1 is a view in vertical section through a furnace constructed in accordance with my invention;

Fig. 2 is a view in plan section taken on line 2—2 of Fig. 1, showing the arrangement of the lateral air passages and boxes;

Fig. 3 is a view also in plan section, taken on line 3—3 of Fig. 1, showing the arrangement of the sub-floor air ducts;

Fig. 4 is a cross-sectional view through the furnace, taken on line 4—4 of Fig. 1, showing the air boxes and passages at the front of the furnace;

Fig. 5 is an enlarged detail view of the damper-operating device, taken on line 5—5 of Fig. 2;

Fig. 6 is an enlarged plan view of the damper-operating shaft and locking device;

Fig. 7 is an enlarged view in cross-section through the central part of the grate, taken on line 7—7 of Fig. 1; and Fig. 8 is an enlarged view in vertical section of the front part of the furnace, taken on line 8—8 of Fig. 7, and showing the arrangement of the air passages and ducts.

Referring to the drawings, the parts of the furnace illustrated and pertaining to the invention comprise, in general, the side walls 10, 10, of the brick construction common to furnace settings; a front wall 12; a coking breast 13, extending rearwardly and over the forward end of the fire box or combustion chamber, said front wall and coking breast supporting the forward end of the header and lower bank of boiler tubes 14.

Rearwardly of the front wall 12, and extending upwardly from the foundation of the furnace setting, is a bridge wall 15. Within the fire box and extending forwardly from the bridge wall 15, beyond the front wall 12, is the grate 16, the same having the form of an endless chain, as before mentioned, formed of a multitude of connected together links and extending throughout the length of the combustion chamber and forwardly a short distance beyond the front wall 12. For convenience the grate may be considered as consisting of two parallel portions or leads, the upper portion or lead 17 constituting the active or fuel bed supporting area of the grate, and the lower lead or portion 18, spaced below the upper lead, being the non-active part which is constantly moving forward in the operation of the grate.

The chain grate is supported and operated in the following manner: At the sides of the grate and in contact with the inner surface of the side walls 10, 10 are vertical side frame members or plates 19, 19, provided along their upper margins with a plurality of inwardly projecting flanges 20, 20, upon which are mounted bearing members 21, spaced apart at suitable intervals along the side frame members and supporting the ends of the journals of a plurality of parallel and transversely extending rollers 22, which pass beneath the upper portion or lead 17 of the chain grate and support the same. The rear ends of the side frame members 19, 19 terminate short of the bridge wall, there being mounted upon the rearmost side frame member rearwardly extending bearing plates 23, 23, provided with bearings 24, 24, on which is journaled a shaft 25, carrying a plurality of sprocket wheels 26, 26, engaging and supporting the rear end of the chain grate.

The side frame members 19 extend or are continued outwardly beyond the front wall 12 of the furnace and exterior of the fire box in the form of vertical plates or walls 27, 27, there being journaled in suitable bearings in said walls a shaft 28, likewise carrying a series of sprocket wheels 29 meshing with and carrying the forward end of the chain grate. Suitable driving mechanism (not shown) serves to rotate the shaft 28, thereby actuating the chain grate in a manner to move the upper lead 17 in a rearward direction. Immediately above the forward end of the grate is the fuel hopper 30, formed by vertical extensions of the walls 27, 27, a downwardly inclined rear wall 31, and the front wall of the furnace, said hopper communicating at its bottom with the fire box and immediately above the surface of the grate, through an elongated opening 32, said opening being capable of regulation, as to size, by means of a vertically movable gate 33 and suitable actuating devices (not shown). The fuel is introduced into the hopper 30 in the usual manner, from whence it is fed onto the forward end of the grate and is carried rearwardly on the moving grate until it reaches the rear end, in the form of ash, where it drops by gravity into the ash pit or other receptacle.

Referring now more in detail to the construction of the interior of the furnace, whereby the compartment arrangement is secured: In general, it may be said that the space between the upper and lower leads 17 and 18 of the grate, and inwardly from the front wall of the furnace, is divided into a plurality of chambers or compartments in the following manner: As shown in Figs. 1 and 3, the side frame members 19 consist of a plurality of similar units, of equal length and illustrated as three on either side of the grate and arranged in corresponding pairs. The side frame members are provided at their adjacent ends with inwardly extending vertical flanges 34, arranged at right angles to the side walls and spaced apart a short distance so as to provide between adjacent side frame members a space extending the full height thereof. Extending transversely of the side frame members 19, are a plurality of transverse frame members 35, the same preferably having the form of I-beam sections having transverse webs 36 and 37 along the upper and lower margins of an intermediate vertical web. The transverse frame members are so positioned and of such width as to extend vertically from the supporting rollers 22 of the upper lead 17 of the grate downwardly in close proximity to the upper surface of the lower chain or lead 18 of the grate. The transverse frame members are supported by the side frame members, the ends thereof extending into the spaces between the flanges 34, 34 of the side frame members (the transverse webs 36 and 37 being preferably removed throughout the portions of the frame members extending between the flanges 34, 34 of the side frame members). As shown in Fig. 7, the flanges 34 of the side wall sections are provided throughout the portions thereof intermediate the upper and lower leads of the grate 16 with extensions 38, 38, projecting inwardly beyond the lateral margins of the grate and rigidly connected to the transverse frame members by means of bolts 39.

It is to be observed that the structure thus far described, namely, the side frame members, the transverse frame members, and the vertical flanges of the side frame sections 34, constitute the partitions or dividing walls of several compartments 40, 41, and 42, said partitions extending horizontally between the upper and lower leads 17 and 18 of the grate and vertically on either side of the grate, downwardly from the margins of the upper lead 17 of the grate to the floor level of the furnace setting.

Extending vertically downward below the lower lead of the grate, are a plurality of transverse plates 43 extending transversely between the side frame members 19 and in the vertical plane of the transverse frame members 35, the ends of said plates extending between the flanges 34 of said side frame members and connected thereto in the same manner as the transverse frame members, said plates forming, in effect, a continuation of the transverse frame members below the grate. The plates 44, however, do not extend downwardly to the floor level of the furnace, but terminate a distance above, the lower margin being preferably curved, thereby forming arched openings connecting the several compartments and forming a continuous passage or air space below the grate. Integral with the upper margins of the plates 43 and at the ends thereof are bearings 45, in which are journaled the lower rollers 46, which engage and support the lower lead 18 of the chain grate.

In order to complete the formation of the desired air chambers and passages, each compartment is further subdivided, by the provision of partition walls or plates constructed and arranged as follows: Extending longitudinally of each compartment between the transverse frame members forming the end walls thereof, and within the space between the upper and lower leads 17 and 18 of the grate, is mounted a wall or deflecting plate 47, resembling an inverted V in sectional contour, said plate consisting of two downwardly inclined surfaces which meet just below the under surface of the upper lead 17 of the grate and centrally thereof, the inclined parts terminating just above the lower lead of the grate and with the edges thereof in vertical alinement with the edges of the grate. The plate 47 divides the space between the leads of the grate into at least two separate air chambers or spaces, one being spaced below the plate 47 and above the lower lead of the grate, and the other above the plate 47 and below the upper lead 17 of the grate, the latter being in reality two chambers, inasmuch as the proximity of the central apex of the plate to the under surface of the upper lead of the grate practically separates the spaces on either side. The chambers of the several compartments located below the plates 47 are preferably connected one with the other by the provision of large triangular shaped openings 48, which are formed in the transverse frame members 35 and are substantially as large as the sectional area of the chambers, thus permitting communication between the compartments below the plates 47 for the passage of air; in fact, it may be said that there is formed thereby a continuous air space or longitudinal passage extending from the forward to the rear transverse frame member; the rear frame member serving to close that end of the passage, whereas the front transverse frame member is provided with an opening serving as the discharge opening of the passage, as will hereinafter be more fully described.

Spaced inwardly from the side frame members of each compartment and parallel therewith are vertical partition walls or plates 49, 49, said plates extending between and rigidly secured to the flanges 34 of each side frame member and vertically from the floor level of the furnace, above the side margins of the plate 47, which engage or abut against the vertical plates 49. These vertical partition walls serve to further divide the compartments into vertical passages at either side of each compartment, said passages being arranged in pairs 50, 51, and 52, each pair being associated with each compartment 40, 41, and 42, respectively. The passages thus formed communicate at their upper ends with the chamber above the plates 47 and at their lower ends with air ducts, about to be described, it being noted that the vertical passages are closed from communication with the air space below the lower grate as well as the air passage below the plates 47.

The means employed to deliver air to the several compartments, and more particularly to the vertical passages, will now be described. Below the floor level of the furnace is provided a rectangular space extending throughout the length of the grate and between the side walls 10, 10, said space being preferably covered by a plate 53, of metal or other suitable construction and serving as the floor of the air space below the grate and between the side plates 27, 27 in front of the furnace. The sub-floor space is divided into longitudinally extending ducts or air passages, formed and arranged in the following manner: Extending rearwardly from the forward end of the furnace, at a point below the front wall 12, are a plurality of vertical partition walls 54, arranged in parallel relation and spaced apart transversely, so as to form a series of longitudinally extending passages or ducts, preferably arranged in pairs 55, 55 and 56, 56 and a single central duct 57. The outermost pair 55, 55 extend beneath the forward compartment, the outer vertical walls 54, 54 being curved outwardly to close the rear end of said ducts, the inner pair 56, 56 extending rearwardly beneath the middle compartment and closed, as before, by the curved end portions of the inner walls 54, 54. The central duct 57 opens into the rectangular space beneath the rear compartment 42.

The air ducts thus formed communicate with the lower ends of the vertical passages associated with the compartment by a plurality of openings 58 extending throughout the length of the compartment and formed by terminating the floor plate inwardly from the side walls 10, 10, as shown in Fig. 7, each pair of ducts 55, 55 thus communicating with the passages 50, 50 of the first compartment, the other pair of ducts communicating with the passages 51, 51 of the middle compartment, and the central duct 57 communicating with the vertical passages 52, 52 of the rear compartment, through the intermediate rectangular spaces.

The outer or forward ends of the ducts 55, 56, and 57 communicate with a space or cross passage 59 extending transversely of said ducts 55, 56, and 57, said cross passage being adapted to supply air to all of said ducts from a single source of supply, preferably in the form of a fan or air turbine 60 mounted in said passage (Fig. 3), the air being supplied to the turbine from sources hereinafter described.

In order to regulate the supply of air to the ducts 55, 56 and 57, there is mounted at the entrance to each duct a damper 61, similar in construction and operation, therefore but one need be described. Considering, therefore, the damper 61 (Figs. 1 and 3) of the central duct 57, the same consists of a rectangular plate hinged along its lower margin on suitable supports adjacent the bottom of the duct and adapted when in closed position to occupy a vertical position completely closing the entrance. Pivotally connected to the damper is a rod 62, extending forwardly and terminating adjacent the forward wall 63 of the cross passage 59, there being mounted upon said wall a bracket 64 (Fig. 5), which rotatively supports a vertical shaft 65, provided at its lower end with a crank 66 connected to the adjacent end of the rod 62. The upper end of the shaft projects through the floor plate 53 and is provided, above the floor, with a square head 67, adapted to receive a wrench or other tool for the purpose of rotating the shaft, thereby moving the rod endwise in either direction to open or close the damper. In order that the damper may be locked in several positions of adjustment, the upper end of the shaft is provided with an integral disk 68 (Fig. 6), having a plurality of circumferentially arranged holes, adapted to register with a hole in the floor plate 53. A pin 69, insertible through one of the holes in the disk and the hole in the floor plate, serves to lock the shaft in position of rotative adjustment. Each of the dampers is provided with a similar operating and adjustment device, so that each can be operated and the amount of draft therethrough regulated, independently of each other.

In describing the construction whereby the air is supplied to the air ducts below the floor, by means of the air circulating device or fan 60, reference is again made to the air spaces below the partition walls 47 of each compartment, which are connected to form an air passage by provision of the openings 48 in the intermediate transverse frame members 35. This air passage opens downwardly upon the lower lead 18 of the grate and communicates, through the interstices between the links of the grate, with the air space below, said air space being open to the atmosphere through the front of the furnace, which is entirely open below the grate. It is clear, therefore, that if free air enters or is drawn into the air space below the lead 18 of the grate, it will pass through said lead and into the passage above, the circulation of air being distributed throughout the entire area of the grate surface exposed to the air space.

Referring to Fig. 8, the forward end of the air passage above the lower lead 18 of the grate communicates with a transverse air duct or box 70, located between the leads of the grate and preferably of rectangular shape, having an open side which abuts against the outer face of the forward transverse frame member 35 and covers the opening 48 therein. The cross duct or air box 70 communicates at its ends with vertically arranged air boxes 71, 71, which extend downwardly on opposite sides of the grate, said air boxes 71, 71 being preferably of a width equal to the vertical passages 50 adjacent thereto and in horizontal alinement therewith. The air boxes are preferably of cast metal construction, integral with the side plates 27, 27, the latter forming the outer walls thereof. As shown in Figs. 1 and 8, the air boxes are tapered or inclined, having a front or top wall 72, which extends downwardly from the upper wall of the cross duct 70 at an inclination of substantially 45°, terminating at the floor level, where it merges with vertical walls 73 extending below the floor plate and forming the surrounding walls of a transverse chamber 74 immediately forward of the cross duct \59. The parallel and vertical side walls 75 and 76, the latter being formed in part by the side plates 27, 27, extend below the floor level adjacent the chamber 74 and form the openings 77, 77 (Fig. 2) which connect the vertical air boxes with the chamber 74, the rear walls 78, 78 extending vertically downward and terminating at the floor level. As shown in Figs. 2 and 8, the openings 77, 77 extend only throughout the forward part of the air boxes, there being provided a vertical wall 79 (Fig. 8) below the floor level and intermediate the front and rear ends of said boxes and below the floor, which forms the rear wall of the openings.

It is seen, therefore, that the vertical air boxes 71, 71 and the cross duct 70 form passages connecting the space above the lower lead of the grate with the chamber below the floor, from which the air is forced into the air ducts 55, 56, and 57, where it is carried upwardly through the vertical passages 40, 41, and 42 and into the spaces of the several compartments above the plate 47 and thence through the upper lead of the grate and fuel bed, in the usual manner. The fan or air turbine 60 thus serves a double purpose, that is, a suction device to draw the free air into the free air space below the grate upwardly through the lower lead into the air passage above the lower lead and then forwardly and downwardly through the side air boxes 71, 71 into the chamber 74, where it is forced into the air ducts supplying the upper lead of the grate, as before described.

A furnace constructed in accordance with my invention embodies a combination of the desirable features of both natural and forced drafts, in that the cooling of the grate and preheating of the air follow from the passage of the air upwardly through the lower part of the grate, as in the usual natural draft, whereas the accurate regulation of the operating conditions of the furnace that attends the use of forced draft is also present.

The construction whereby these results are accomplished may obviously be modified in details of construction, without departing from the spirit of the invention, and for that reason I do not wish to limit the scope of the invention, except in so far as specifically pointed out in the appended claims.

I claim as my invention:

1. In a furnace, the combination of a chain grate, a compartment beneath the upper lead of said grate and separated from a free air space extending above and below the lower lead of said grate, said free air space being provided with a discharge opening above said lower lead, an air duct extending from said opening downwardly beneath and upwardly at one side of said free air space to said compartment, and air circulating means located in said air duct.

2. In a furnace, the combination of a chain grate, a partition wall mounted between the leads of said grate and forming a compartment beneath the upper lead of said grate, separated from a free air space therebelow, an air duct communicating with said free air space at a point above the lower lead of said grate and extending downwardly and longitudinally beneath said free air space, a vertical air passage connecting said compartment with said air duct, and air circulating means in said air duct.

3. In a furnace, the combination of a chain grate, a transverse partition plate mounted between the upper and lower leads of said grate, vertical plates extending downwardly adjacent the outer edges of the lower leads of said grate, said plates forming a compartment beneath the upper lead of the grate and a lateral passage separated from the free air space of the furnace, an air duct communicating at one end with said free air space at a point above the lower lead of the grate and at its opposite end with said lateral air passage, and air circulating means mounted in said air duct.

4. In a furnace, the combination of a chain grate, a partition plate mounted between the upper and lower leads of said grate and forming an air space separated from the free air space below said grate, vertical plates adjacent the side of the lower lead of the grate and forming with the side walls of the furnace lateral air passages communicating with said compartment, a plurality of longitudinal air ducts below the free air space, each communicating at one end with one of said lateral air passages, a vertical air duct communicating with the free air space above the lower lead of the grate and with the other ends of said longitudinal air ducts, and air circulating means in said air ducts.

5. In a furnace, the combination of an endless chain grate, a partition wall intermediate the upper and lower leads of said grate and forming an air chamber beneath the upper lead of the grate, a longitudinal air duct below the floor level of the furnace and communicating with said chamber, an air duct communicating with the free air space above the lower lead of the grate and extending downwardly and communicating with the longitudinal air duct below the floor level, and an air circulating device mounted in one of said air ducts.

6. In a furnace, the combination of an endless chain grate, the space between the upper and lower leads of said grate being divided into a plurality of chambers below the upper lead of the grate, and an air passage above the lower lead of the grate, the latter communicating with a free air space through the lower lead of the grate, an air duct communicating with one end of said free air passage, a plurality of air ducts below the free air space, each communicating with one of said chambers, an air passage communicating with said air ducts and with said free air space above the lower lead of the grate, and an air circulating device in said air passage.

7. In a furnace, the combination of an endless chain grate, partition walls between the upper and lower leads of the grate and forming a plurality of air chambers below the upper lead of the grate and a free air space above the lower lead of the grate, a plurality of air ducts below the floor of the furnace and communicating with corresponding air chambers, a damper in each of said air ducts, an air passage communicating with all of said air ducts and with said free air space above the lower lead of the grate, and an air circulating device in said air passage.

8. In a furnace, the combination of an endless chain grate, partition members in the space between the upper and lower leads and forming a series of air chambers below the upper lead of the grate and an air passage above the lower lead of the grate having open communication with the free air space of the furnace through said lower lead, an air duct communicating with one end of the free air passage and extending downwardly below the floor level of the furnace, a plurality of longitudinal air ducts below the floor level, each communicating with one of said chambers and with said air passage, and a mechanical air circulating device mounted in said air passage.

9. In a furnace, the combination of an endless chain grate, partition walls extending intermediate the upper and lower leads of the grate and downwardly to the bottom of the air space below the grate and forming a chamber below the upper lead of the grate and a vertical air passage communicating therewith, there being provided a free air space above the lower lead of the grate, a separate vertical air passage communicating with one end of said free air space and extending downwardly below the floor of the furnace, an air duct below the floor, connecting said vertical passages, and an air circulating device in said air duct.

10. In a furnace, the combination of an endless chain grate, a plurality of transverse frame members extending between the side walls of the furnace and between the upper and lower leads of the grate, a plurality of partition walls extending between said transverse members and spaced below the upper lead of the grate and forming a plurality of compartments, the air space below said partition walls extending throughout said compartments and in open communication with the free air space of the furnace through the lower lead of the grate, an air duct communicating with one end of the free air space above the lower lead of the grate and extending downwardly to the floor level of the furnace, a series of longitudinal air ducts below the floor level, each communicating with one of said compartments, a chamber communicating with the outer ends of said air ducts and with said free air space, and a mechanical air circulating device mounted in said chamber.

In testimony that I claim the foregoing as my invention, I affix my signature in the presence of two witnesses, this 2nd day of December, A. D. 1916.

HERMAN A. POPPENHUSEN.

Witnesses:
CHARLES H. POOLE,
CLARA L. PEOPLES.